(12) United States Patent
Celia et al.

(10) Patent No.: US 9,191,603 B2
(45) Date of Patent: Nov. 17, 2015

(54) METHOD FOR AUTOMATICALLY PROGRAMMING A RECEIVER ABLE TO RECEIVE RADIO TELEVISION SIGNALS IN AT LEAST TWO DIFFERENT FORMATS AND RELATED RECEIVER

(75) Inventors: Saverio Celia, Turin (IT); Giovanni Ballocca, Turin (IT)

(73) Assignee: Sisvel Technology S.R.L., None (TO) (IT)

( * ) Notice: Subject to any disclaimer, the term of this patent is extended or adjusted under 35 U.S.C. 154(b) by 0 days.

(21) Appl. No.: 13/516,606

(22) PCT Filed: Dec. 17, 2010

(86) PCT No.: PCT/IB2010/055911
§ 371 (c)(1),
(2), (4) Date: Aug. 9, 2012

(87) PCT Pub. No.: WO2011/077341
PCT Pub. Date: Jun. 30, 2011

(65) Prior Publication Data
US 2012/0320279 A1  Dec. 20, 2012

(30) Foreign Application Priority Data
Dec. 21, 2009  (IT) .............................. TO2009A1010

(51) Int. Cl.
*H04N 5/50* (2006.01)
*H04N 5/44* (2011.01)
(Continued)

(52) U.S. Cl.
CPC ............. *H04N 5/44* (2013.01); *H04N 21/4263* (2013.01); *H04N 21/4348* (2013.01); *H04N 21/4622* (2013.01); *H04N 21/4823* (2013.01); *H04N 21/6112* (2013.01); *H04N 21/84* (2013.01)

(58) Field of Classification Search
CPC .................................. H04N 5/50; H04N 5/44
See application file for complete search history.

(56) References Cited

U.S. PATENT DOCUMENTS

2003/0151698 A1* 8/2003 Ishihara et al. ............... 348/723
2004/0177372 A1* 9/2004 Du et al. ......................... 725/59
(Continued)

FOREIGN PATENT DOCUMENTS

EP  0 486 988  5/1992
JP  2007-142692  11/2005

OTHER PUBLICATIONS

International Preliminary Report on Patentability issued Jun. 26, 2012 in PCT Application No. PCT/IB2010/055911, filed Dec. 17, 2010.
International Search Report dated Oct. 28, 2011, issued in PCT/IB2010/055911, filed Dec. 17, 2010.
Written Opinion dated Oct. 28, 2011, issued in PCT/IB2010/055911, filed Dec. 17, 2010.

*Primary Examiner* — Jefferey Harold
*Assistant Examiner* — Samira Monshi
(74) *Attorney, Agent, or Firm* — Workman Nydegger (57) ABSTRACT

A method for automatically programming a receiver adapted to receive radio-television signals belonging to a plurality of radio-television networks in at least two different formats includes the steps of: storing into a first table a first plurality of programs of the plurality of radio-television networks receivable by the receiver in a first signal format, associable with a first sorting criterion of the first programs; storing into a second table a second plurality of programs of the plurality of radio-television networks receivable by the receiver in a second signal format, associable with a second sorting criterion of the second programs, including a step of storing into a third table programs stored in the first and second tables based on existing matches between the first and the second sorting criteria.

22 Claims, 6 Drawing Sheets

400

| N | Programma | N | Programma |
|---|---|---|---|
| 1 | RAIUNO | 11 | FR 24 |
| 2 | RAIDUE | 12 | |
| 3 | RAITRE | 13 | |
| 4 | RETE 4 | 14 | |
| 5 | CANALE 5 | 15 | BOING |
| 6 | ITALIA 1 | 16 | RAI NEWS 24 |
| 7 | LA 7 | 17 | RAI STORIA |
| 8 | MTV | 18 | RAI GULP |
| 9 | DEEJAY TV | 19 | RAI 4 |
| 10 | REPUBBLICA TV | 20 | K2 – KIDS TV |

(51) Int. Cl.
*H04N 21/426* (2011.01)
*H04N 21/434* (2011.01)
*H04N 21/462* (2011.01)
*H04N 21/482* (2011.01)
*H04N 21/61* (2011.01)
*H04N 21/84* (2011.01)

(56) References Cited

U.S. PATENT DOCUMENTS

2007/0099654 A1   5/2007  Schadenko
2008/0005768 A1*  1/2008  Sakai .............................. 725/73
2009/0055868 A1*  2/2009  Wehmeyer et al. ............. 725/40

* cited by examiner

| LCN | Programma | LCN | Programma |
|---|---|---|---|
| 1 | RAIUNO | 11 | FR 24 |
| 2 | RAIDUE | 12 | Non assegnato |
| 3 | RAITRE | 13 | Non assegnato |
| 4 | RETE 4 | 14 | Non assegnato |
| 5 | CANALE 5 | 15 | BOING |
| 6 | ITALIA 1 | 16 | RAI NEWS 24 |
| 7 | LA 7 | 17 | RAI STORIA |
| 8 | MTV | 18 | RAI GULP |
| 9 | DEEJAY TV | 19 | RAI 4 |
| 10 | REPUBBLICA TV | 20 | K2 – KIDS TV |

Fig. 3

| Posizione | Programma |
|---|---|
| 1 | RAIUNO |
| 2 | RAIDUE |
| 3 | RAITRE |
| 4 | RETE 4 |
| 5 | CANALE 5 |
| 6 | ITALIA 1 |

METHOD FOR AUTOMATICALLY PROGRAMMING A RECEIVER ABLE TO RECEIVE RADIO TELEVISION SIGNALS IN AT LEAST TWO DIFFERENT FORMATS AND RELATED RECEIVER

BACKGROUND OF THE INVENTION

1. Field of the Invention

The present invention relates to the field of methods for automatically programming radio-television signal receivers; more in particular, it relates to a device and a method for automatically programming a receiver adapted to receive radio-television signals in at least two different formats.

2. Present State of the Art

During the transition, or switchover, from analog to digital television, analog television will be gradually suppressed. During this transition phase, which according to the European Union's plans will end in 2012 in Europe, all television stations will cease broadcasting in analog format and will have to broadcast exclusively in digital format. The transition of a given program from analog to digital occurs in a rather abrupt manner. A television station will suddenly stop broadcasting in analog format in a certain channel and will start broadcasting in digital format in the same channel previously occupied by the analog station or in another channel.

During said switchover phase, the territorial coverage of the digital signal may undergo some discontinuity. In fact, it may happen that in a certain area a program is only received in analog format, while in another area it is only received in digital format, and in yet another area it is received in both the analog and digital formats.

In the technical terminology used in digital radio-television broadcasting, the term "service" is generally employed to indicate what in the analog world is called "program". In this context, the term "program" is used to indicate both an analog program and a digital service.

Some television receivers currently available on the market are equipped with a dual tuner capable of receiving both radio-television signals in a first format, in particular analog television signals, and radio-television signals in a second format, in particular digital television signals.

On the other hand, radio-television receivers are also becoming widespread which are capable of receiving both cable radio-television programs transported by using the TCP/IP protocol and radio-television programs receivable through electromagnetic signals irradiated by suitable terrestrial or satellite broadcasting stations.

The term "signal format" refers herein to a signal having particular structural characteristics in terms of encoding (e.g. MPEG2, MPEG4), typology (analog or digital) and distribution (cable, satellite, terrestrial, mobile, Internet).

For the purposes of the present description, the following different radio-television signal formats will be taken into account: PAL signals, SECAM signals, NTSC signals, DVB-T signals, DVB-T2 signals, DVB-C signals, DVB-S signals, DVB-H signals, encapsulated radio-television signals broadcast on packet-switching networks, e.g. by using the IP protocol (Internet Protocol), and other types of signals, whether present or future, which differ in their encoding, typology and distribution mode.

As known, many radio-television signal receivers available on the market are fitted with systems for automatically programming the radio-television programs: analog radio-television signal receivers utilise, for example, the so-called ATSS system (Automatic Tuning and Sorting System) described in European patent no. EP 0486988, whereas digital radio-television signal receivers employ a system based on the logic channel number (LCN).

Said logic channel number, hereafter referred to as "LCN code", is a number assigned by consortia of radio-television broadcasters to a certain program receivable in a certain geographical or catchment area.

The ATSS system allows to create an automatic procedure for searching the programs receivable in the television frequency bands of the analog signal, as well as to sort them afterwards in a predefined order independent of their transmission frequency and set at the factory on the basis of criteria common to the users in a certain catchment area, typically consisting of a national state.

Instead, the LCN is a numerical code which identifies the programs broadcast in digital terrestrial format by the various broadcasters, and is used by most digital terrestrial television receivers for the purpose of automatically assigning to each received program a predefined position in the program list.

The term "program list or table" is used in this context to indicate a sorted sequence of radio-television programs which the radio-television signal receiver can tune to, regardless of the broadcasting source and of the transmission means in use, wherein each program is associated with a particular numerical key of a keypad or remote control that can be selected by the user.

During the switchover from analog to digital, i.e. from a radio-television signal in a first format to a radio-television signal in a second format, the systems for automatically programming radio-television programs implemented in a radio-television signal receiver generate program lists subject to different destinies. In fact, as the switchover phase goes on, the analog program list will have more and more empty positions, while the digital program list will have less and less empty positions until, when the switchover is completed, the analog program list will be totally empty and therefore only the digital program list will be used.

In the future there will be a similar transition when radio-television program broadcasting gradually switches from the DVB-T system, i.e. a digital signal in a first format, to the DVB-T2 system, i.e. a digital signal in a second format.

Again, there will be a switchover phase in which it may happen that in a certain geographical area radio-television signals can be received simultaneously in a first and a second digital formats, which may or may not belong to the same radio-television stations (e.g. RAIUNO, RETE 4), so that there may be similar situations of programs existing in two different radio-television signal formats.

United States patent application US 2007/0099654 describes a television signal receiver which comprises both an analog tuner and a digital tuner, so that it can receive both analog and digital television signals. Said receiver further comprises control means which generate a table based on the logic channel number (LCN) of the digital television signal broadcast by the television station.

The table based on the logic channel number is stored by the television signal receiver into a memory, so that it can be retrieved by the receiver control means to select the program chosen by the user, e.g. BBC or MTV.

The method described in said US patent application is implemented during a scan of the frequency spectrum of the television signals receivable by the television receiver, and includes the following steps:

if a digital television signal with a logic channel number is found, then the associated program will be assigned, in the program table, the position corresponding to the logic channel number;

if a digital television signal without a logic channel number is found, then the associated program will be assigned, in the program table, the first available position or the first position available after a predetermined position;

if a digital television signal with a logic channel number is found, but the position where it should be placed is already taken by an analog program, then the associated digital program will be assigned, in the program table, the position corresponding to the logic channel number, while the analog program will be assigned the first subsequent position available in the table;

if an analog television signal is found, then the associated program will be assigned the first position available in the program table.

However, the result of this program sorting made in accordance with said US patent application may not be liked by the user, since said result will depend on the order in which analog television signals are transmitted. Therefore, it may happen than a user accustomed to associating a certain program with one specific remote control key cannot figure out the sorting generated by the television signal receiver using the method of said US patent application.

For example, Italian users are used to associating key 1 with RAIUNO, key 2 with RAIDUE, key 3 with RAITRE, key 4 with RETE 4, key 5 with CANALE 5, key 6 with ITALIA 1, and key 7 with LA7. In those Italian regions where RAI2 and RETE 4 are only broadcast in digital format, the television signal receiver according to said US patent application will correctly place RAI2 in position 2 and RETE 4 in position 4, but it may, for example, place LA7 in the first position if that program's transmission frequency is the first one which is encountered during the automatic procedure that scans the frequency channels assigned to radio-television stations. This will confuse the user, who is accustomed to seeing at least some of the receivable programs in a certain order, thus forcing him/her to carry out a time-consuming manual procedure to put the channels back into the desired sequence.

As known, the user can also be allowed to create a list or table of favourite programs according to his/her own preferences, by combining the radio-television stations included in the program tables generated by the radio-television signal receiver according to specific sorting criteria. However, such a favourite program table must be built manually by picking the programs stored in the various radio-television program tables one by one, thus requiring a long, annoying and repetitive series of operations. Moreover, current dual-tuner receivers include two program tables associated with the two tuners, so that the user must remember not only the number, but also in which one of the two program tables the desired program has been stored. Modern receivers are typically equipped with a key for switching between the two tables, which must be pressed in order to switch from one tuner to the other, resulting in a longer switching time and more keys to be pressed to watch the desired program.

The teaching of the present invention is also applicable to this kind of receivers, thus bringing a considerable advantage to the user when selecting radio-television programs.

SUMMARY OF THE INVENTION

Similar considerations can be made as regards a receiver fitted with a reception device adapted to receive radio-television programs distributed over different transmission media, such as cable, satellite and terrestrial distribution network.

In such a case, the standard or format of the radio-television signal is typically adapted to the peculiarities of each transmission medium, such as catchment area, transmission frequency, modulation and encoding type, transmission channel capacity, geographical coverage, transported contents, and so on.

This involves the need of including in the receiver specific reception and tuning means for each type of radio-television signal to be received. In general, also in this case the device and method according to the present invention allow to generate a unified program table which can preserve the order or arrangement of the radio-television stations stored therein.

The object of the present invention is therefore to provide a receiver and a method for automatically programming a receiver able to receive and tune radio-television signals, wherein the radio-television programs are positioned in accordance with the expectations of a user in a certain catchment area.

It is a further object of the present invention to make available to a user a unified table of radio-television programs received in different signal formats, said table being automatically generated by the receiver without needing the user's manual intervention. In short, the method described in the present invention is based on the automatic generation of a program table which includes, in general, radio-television programs receivable by multiple tuners.

This method creates initial program lists associated with the tuners included in the receiver and, starting from such lists, it generates a unified program table which exploits the matches existing in the initial tables so as to make it easier for the user to select the radio-television programs.

The unified program table ensures immediate selection of the radio-television programs, in particular when they are received in just one signal format, i.e. by a single tuner, in that the user does not have to remember which format a certain radio-television program is received in, nor to operate the user selection unit in order to switch to the program table associated with that single tuner.

The method according to the present invention and the device thereof allow the user to avoid having to perform an uncomfortable series of manual operations, since it automatically generates a unified program table already matching the preferences of the users in a certain geographical or catchment area.

Further features of the invention will be set out in the appended claims, which are intended as an integral part of the present description.

BRIEF DESCRIPTION OF THE DRAWINGS

The above objects will become apparent from the detailed description of the method and system according to the invention, with particular reference to the annexed figures, wherein.

DETAILED DESCRIPTION OF THE PREFERRED EMBODIMENTS

Figure 1A:
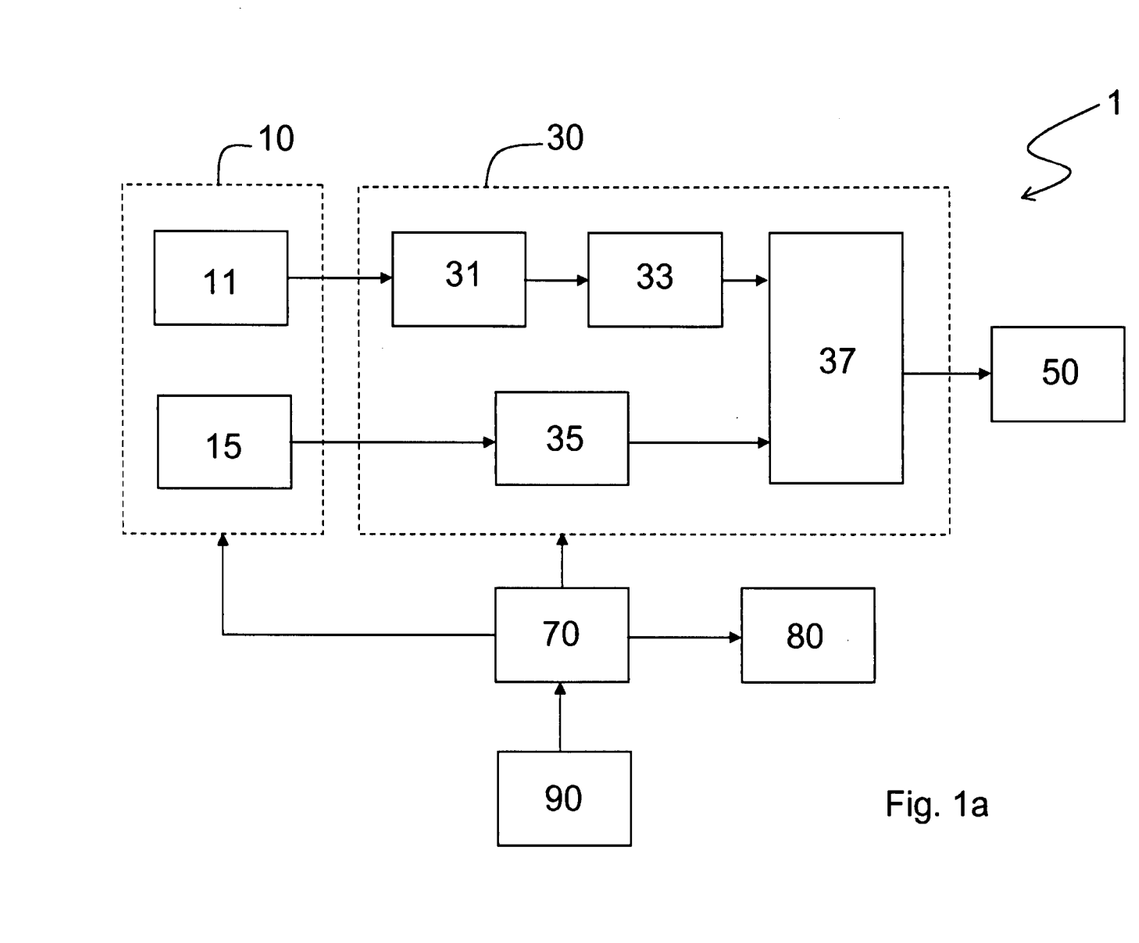
FIGS. 1*a* and 1*b* are block diagrams of a first and a second radio-television signal receivers.

Referring now to FIG. 1a, there is shown a radio-television receiver 1 which comprises:
- a radio-television signal reception unit 10 which receives signals transmitted by external sources such as, for example, a television station;
- signal processing means 30 which process the signals received by the reception unit 10;
- a memory 80 adapted to store program tables or lists;
- control means 70 adapted to control the activity of the reception unit 10, the processing means 30 and the memory 80.

The radio-television signal receiver 1 may also comprise a visualisation device 50, e.g. a screen, a projector, etc. It should be noted that, for the purposes of the present invention, the visualisation device 50 may also not be built in the receiver 1, but associable therewith through any known connection means, whether wired (SCART, HDMI, RCA-Cinch) or wireless. The method according to the present invention can be implemented independently of the presence of the visualisation device 50.

The radio-television signal receiver 1 may, for example, be a television set, a set-top box, a video recorder, a cellular telephone, a computer equipped with a radio-television receiver card, and the like.

The reception unit 10 receives the signals transmitted as radiofrequency signals from one or more antennas (not shown) and outputs the signals to the processing means 30. The reception unit 10 comprises a first tuner 11 adapted to tune to, through a suitable antenna among the available ones, and demodulate a radio-television signal broadcast in a first signal format, e.g. digital, and a second tuner 15 adapted to tune to, through a suitable antenna among the available ones, and demodulate a radio-television signal broadcast in a second signal format, e.g. analog.

The first tuner 11 and the second tuner 15 tune to the digital radio-television signal and the analog radio-television signal, respectively, which are received by a suitable antenna among those available in accordance with a tuner control signal issued by the control means 70.

The signal broadcast in digital format and selected by the first tuner 11 is applied to a demultiplexer 31 as a transport stream. The demultiplexer 31 extracts a video signal, an audio signal and data from the transport stream. A decoder 33 decodes the signals and the data separated in the demultiplexer 31 and outputs the decoded signals and data to a signal processing unit 37. The decoder 33 can extract from the transport stream a first piece of information which is used for determining the sorting criteria of the programs contained therein (e.g. LCN code, service name, network identifier, etc.).

A signal conversion unit 35 converts the signal broadcast in analog format on a frequency channel selected by the second tuner 15 into a video signal which can be processed by the processing unit 37. The conversion unit 35 can also extract from the radio-television signal a second piece of information used for determining the sorting criteria of the programs contained therein, e.g. an identifier ID of the radio-television program. In Europe, for example, EBU (European Broadcasting Union) has established a list of so-called CNI (Country and Network Identification) and VPS (Video Programming System) codes which allow radio-television programs to be univocally identified, upon the respective broadcasters request.

The processing unit 37 processes the input video signal so as to transform it into a format that can be displayed on the visualisation device 50. The processing unit 37 displays on the visualisation device 50 a video image corresponding to the video signal received from the signal conversion unit 35 and from the decoder 33.

The decoder 33 and the conversion unit 35 can extract the audio signal from the received radio-television signal and can be associated with an audio playback unit, not shown in the drawing, which can reproduce said signal. The functions currently performed by separate blocks may in the future be consolidated into single functional blocks, without however any effects upon the invention described herein.

A user selection unit 90 outputs signals to the control means 70 in response to an operation executed by a user. The user selection unit 90 may be implemented in various manners, e.g. a plurality of keys, push-buttons, a remote control and the like, so as to allow a user to select functions, issue commands and perform adjustments.

The memory 80 stores a list of predefined analog programs.

The memory 80 may consist of one or more volatile or non-volatile memory areas.

Said list of predefined programs is preferably a sorted list 95 stored in a first non-volatile memory area of the memory 80, in accordance with a predetermined order independent of the programs' transmission frequency and set at the factory on the basis of criteria common to users in a certain catchment area, typically a national state. For example, one possible program list stored in the memory 80 for Italy may be the one shown in FIG. 2. The total number of programs contained in the sorted list 95 may change from country to country or even locally, depending on preferences known to the manufacturer and/or on requirements considered to be important by the latter. Thus, for example, a given manufacturer may think that LA7 must always be placed in position 7, i.e. with priority 7, for Italian users, and store a 7-position sorted list 95 in which the seventh place is occupied by the identification code of LA7. In this way, the program LA7 will be stored, if present, in position 7 or after the other six radio-television programs with higher priority (less than 7).

Figure 2:
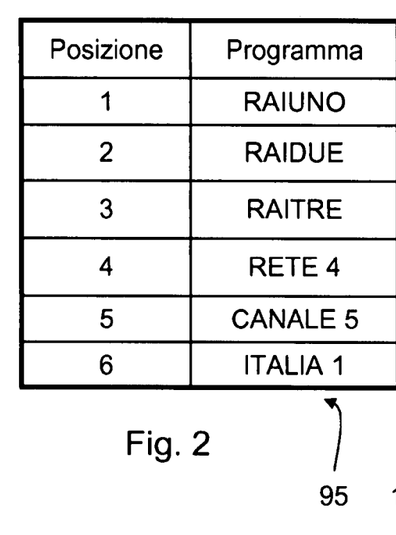
FIG. 2 shows a list of predefined programs.

The predefined program table of FIG. 2 actually represents the data structure present in the memory 80. It can be physically implemented in different forms known to those skilled in the art: for example, it may be implemented as a list, i.e. that data structure known in the information technology field wherein a series of items consisting of one or more data fields are chained in sequence by a pointer to the next item.

Likewise, the position or priority information may also be implemented in various ways. The most elementary way might be an integer representing the desired priority or position in decreasing order, so that the program with the highest priority will be assigned the value 1, the one with the next lower priority will be assigned the value 2, and so on. This does not prevent priority from being represented in alternative forms, such as a decreasing positive or negative integer for decreasing priorities; it is also possible to assign different priority intervals to different countries, so that, for example, Italian radio-television programs may be assigned priority values from 1,000 to 1,999, the German ones may be assigned values from 2,000 to 2,999, and so on.

Alternatively, the priority information assigned to the radio-television programs may be associated with the memory addresses of the memory 80 so that, for example, a given address range is reserved for a certain country and the respective radio-television programs are stored therein in order of priority. In this manner, the Italian program with the highest priority, RAIUNO, will be stored at the first memory address within that range, while the program with the next lower priority, RAIDUE, will be stored at the second memory address, and so on.

The considerations made so far in regard to the various possible implementations of the sorted table or list 95 are likewise applicable to all the other program tables described below. The sorted list 95 may without distinction contain either the identification code associated with the radio-television program assigned by the radio-television regulatory body (e.g. EBU) or any data referable to said code in a form known to the receiver control unit 70.

Figure 3:
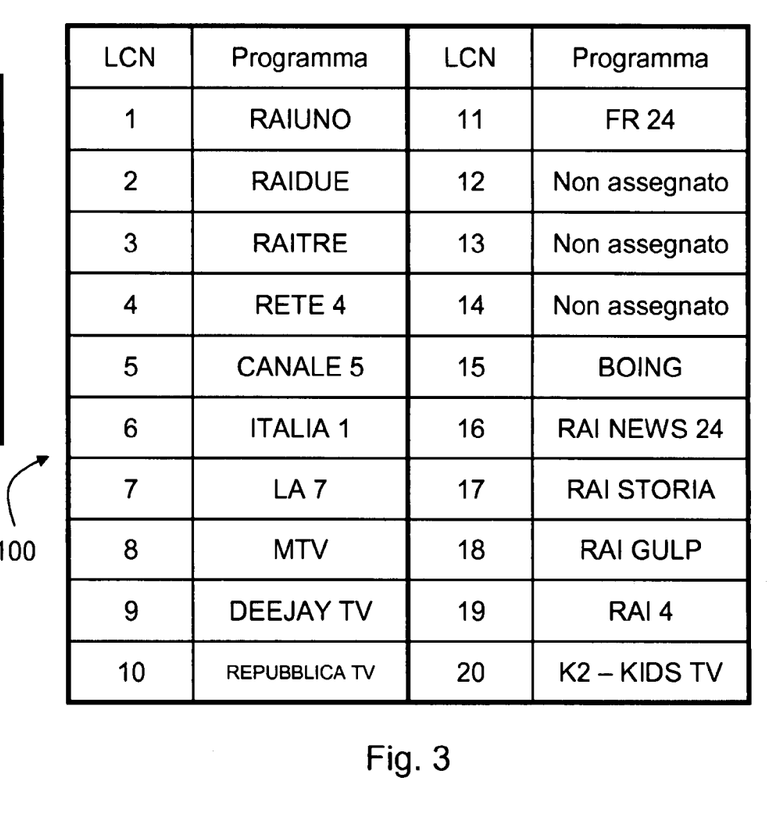
FIG. 3 shows a table indicating associations between program identifiers and programs.

With reference to FIG. 3, one example of a table of Italian radio-television broadcasters will now be described, wherein a program identifier ID, in particular the logic channel number (LCN), is matched to the respective program used in digital radio-television. This table has been defined by mutual agreement by the various radio-television broadcasters; only the first twenty positions thereof are shown in the drawing annexed hereto.

Figure 4:
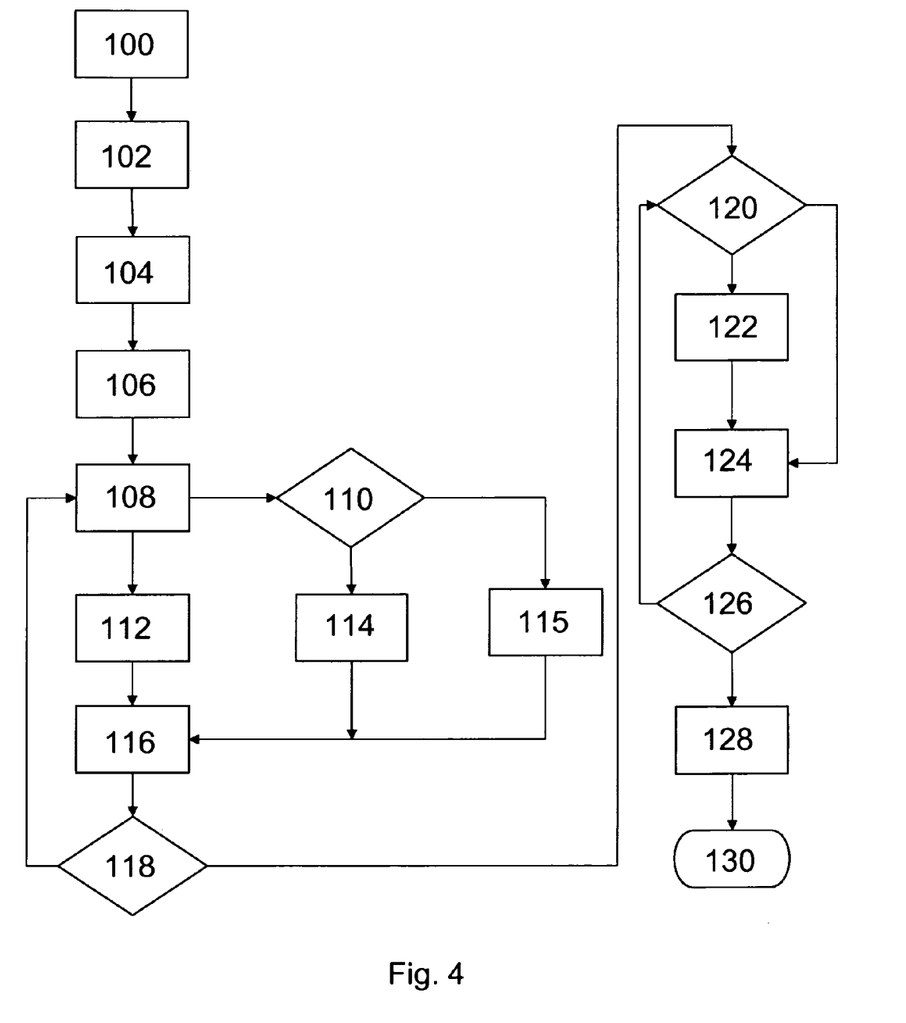
FIG. 4 is a flow chart of a method for automatically programming a radio-television signal receiver, comprising a first and a second tuners adapted to receive radio-television signals in at least two different formats.

Referring now to FIG. 4, there is shown a flow chart of a method for automatically programming a radio-television signal receiver, comprising a first and a second tuners adapted to receive radio-television signals in at least two different formats in accordance with the invention.

In step 100 the user selects, typically through the user selection unit 90, the country and/or language for which the programs are to be received by means of the television signal receiver 1.

The selection options, that is, the countries where the receiver is enabled to operate, are visible on the visualisation device 50 associated with the receiver 1. Said selection options are displayed on the visualisation device 50 as a menu accessible to the user, typically by pressing specific keys of the user selection unit 90. The selection of the country by the user determines the frequency spectrum that the television signal receiver 1 must scan. This step is preferably carried out when the receiver 1 is first installed or reset, but may also be carried out afterwards upon a specific user's request, e.g. when the user moves to a different country or changes his/her place of residence.

Figure 5:
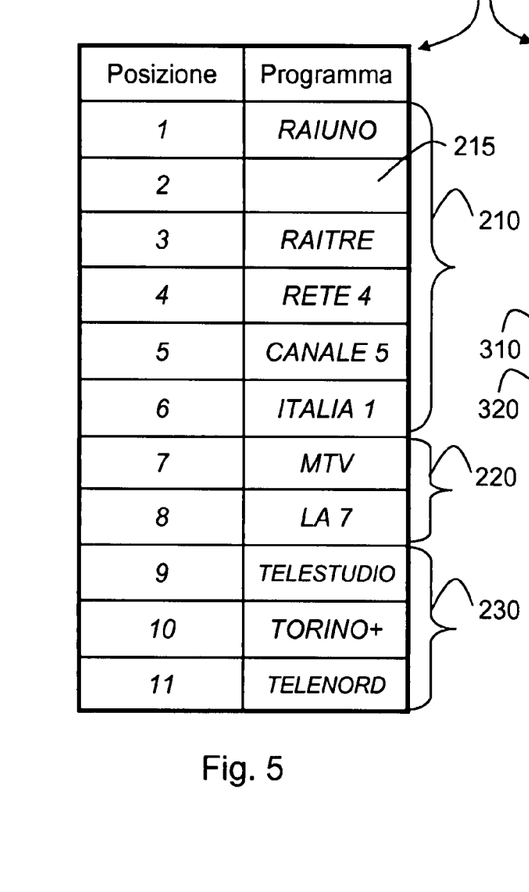
FIG. 5 shows a program list obtained by the radio-television signal receiver following a scan of the frequency spectrum of a radio-television signal in a first signal format.

In step 102, the receiver 1 scans the frequency spectrum of radio-television signals broadcast in analog format and arranges the results in a first table 200, which is stored into the memory 80. One possible result of said analog television signal scan is shown in FIG. 5. The table simply represents an association between program positions selectable by the selection unit 90 and a piece of information which is sufficient to the receiver control unit 70 for tuning to and therefore playing the radio-television program associated with that program position. The table is generated by using a first sorting criterion, e.g. the priority order dictated by the sorted list 95. The receiver control unit 70 can recognise certain radio-television programs based on a code contained in the radio-television signal, and position in the respective memory cell the data necessary to allow the second tuner 15 to subsequently tune to those programs.

In step 104, the receiver scans the frequency spectrum of radio-television signals broadcast in digital format, and arranges the results in a second table 300 according to a second predetermined sorting criterion, e.g. the LCN code contained in the radio-television signal that carries the received programs. The second table 300 is stored into a second memory area of the memory 80. One possible result of said digital radio-television signal scan is shown in FIG. 6.

Here as well, just as in the table of FIG. 2, the receiver control unit 70 can recognise certain radio-television programs based on data contained in the radio-television signal, and can thus position in the respective memory cell the data necessary to allow the first tuner 11 to subsequently tune to those programs. Of course, steps 102 and 104 are interchangeable. It is also apparent that the scan of the frequencies or a subset thereof, if possible, may also occur in parallel, i.e. by scanning a given frequency channel first for digital radio-television signals and then for analog radio-television signals, or vice versa.

Figure 6:
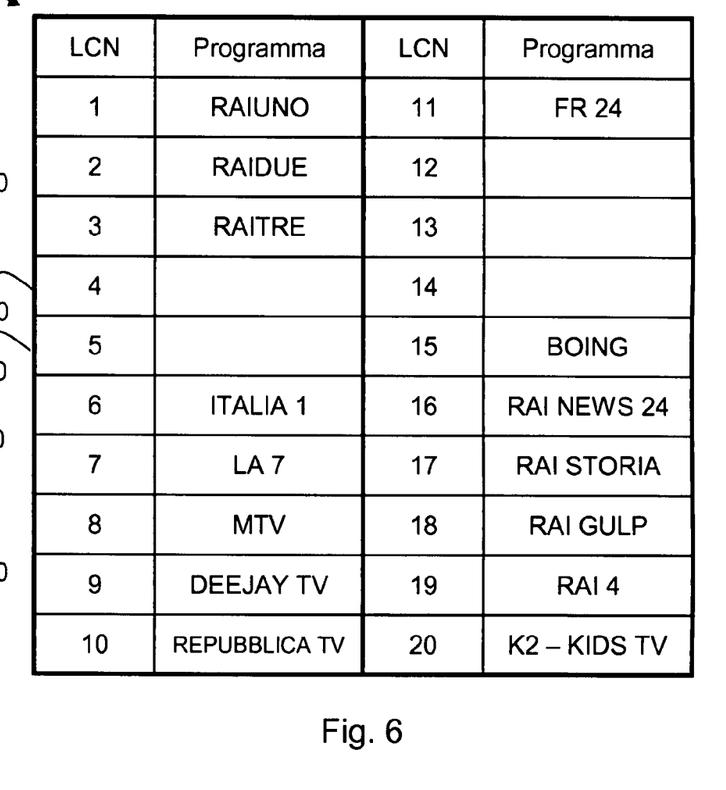
FIG. 6 shows a program list obtained by the radio-television signal receiver following a scan of the frequency spectrum of a radio-television signal in a second signal format.

It is clear that the tables of FIGS. 5 and 6 are only exemplificative and are merely used as a reference for describing the present patent application. They will change depending on when the scans are made and on the geographical area in which the receiver 1 is located during the scans. It is likewise apparent that, for the purposes of the present invention, the ways in which the tables of FIGS. 4 and 6 are obtained are wholly unimportant.

When generating the second table 300, the receiver 1 may also ask the user how it must behave in the event of LCN code duplication, i.e. how it must solve the internal conflicts in the second table 300 following the reception of digital radio-television programs having the same LCN code. The user may be presented, for example, a list of conflicting program names (service names) and their LCN code value, leaving it up to the user to decide how to solve the conflict. As an alternative, the receiver 1 may decide autonomously, e.g. after verifying the identity of the service names of two conflicting programs and/or the characteristics of the contents of the radio-television programs, such as, for example, the presence of high-definition or standard images, the strength of the received signal, the presence of teletext, and so on.

The same applies to the process of generating the first table 200, in the event of duplication of analog programs due to the simultaneous presence of two or more radio-television signals containing the same radio-television program (e.g. RAIUNO), wherein higher importance will be given to a program belonging to the first group of the first table 200. In this case as well, the receiver 1 may automatically decide which one of the two programs named RAIUNO is to be assigned the position 1 of the first table 200 and where to position its duplicate, e.g. deciding according to the strength of the signal or by asking the user for directions.

It should be noted that for the purposes of the present invention it is not important how conflicts are solved, but only the result of their resolution, since it is this result which determines which program will be used for generating the third table 400.

Looking closely to the table of FIG. 5, one can notice that the programs listed therein can be subdivided into three distinct groups:

first analog television programs 210, sorted according to the predetermined sorting criterion of the sorted list 95 of FIG. 2 (first group);

second analog television programs 220, with an identification code ID but not included in the predetermined order of FIG. 2 (second group);

third analog television programs 230, without an identification code ID and not included in the predetermined order of FIG. 2 (third group).

It can also be noticed that the position 2 of program 215 pre-assigned, according to the sorted list 95, to program RAIDUE has remained empty because that program is no longer broadcast in analog format or is received with such a low quality that it cannot be recognised by the receiver 1.

By observing closely to the table of FIG. 6, it can be noticed that the digital programs listed therein are sorted according to the respective LCN code, but there are also some empty positions, like positions 310 and 320, due to the fact that no digital channel having the LCN code 4 or 5 was found during the scan.

Figure 7:
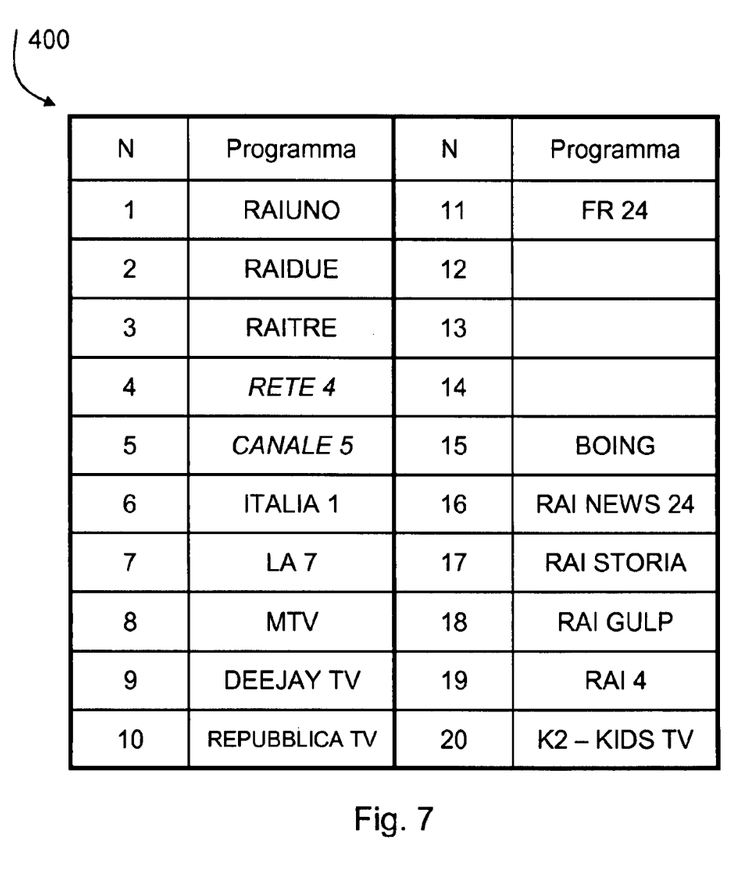
FIG. 7 shows a program list obtained by the radio-television signal receiver by applying the automatic programming method according to the present invention.

The method according to the invention now will provide for creating a third program table 400, shown in FIG. 7, which exploits both the first analog program table 200 and the second digital program table 300. The third program table 400 is therefore optimised, and stores those radio-television network stations which are available locally, irrespective of the signal format, whether analog or digital, in which they are being broadcast.

This optimisation is possible in that the order of the programs of the sorted list 95 matches the assignments of the LCN codes to the digital programs. For example, program RAIUNO is in position 1 of the sorted list 95, and RAIUNO has been assigned the LCN code 1.

Referring back to FIG. 4, in step 106 a counter i is set to value 1.

In step 108 it is verified if there is a television program stored both in the i-th position of the first table 200 and in the i-th position of the second table 300, corresponding to the i-th position of the sorted list 95.

If so (in all verification blocks the lower output is YES, while the side output is NO), in step 112 the program (whether analog or digital) corresponding to the radio-television signal is stored into the i-th position of the third table 400 according to a rule or priority defined by the manufacturer or established or redefined preliminarily by the user before the generation of the third table 400.

For example, the default rule may establish that priority is given to the digital signal over the analog signal; however, the user may change this option in a specific menu, or in response to a question made by the receiver 1 when a case like this occurs.

If said verification carried out in step 108 turns out to be negative, in step 110 it is verified if there is only one radio-television program stored in the first table 200 or in the second table 300 which corresponds to the i-th position of the sorted list 95. If such a program exists, in step 114 the program corresponding to the radio-television signal found is stored into the i-th position of the third table 400.

In the event that there is no program to be stored into the i-th position (step 115), then the receiver 1 may either perform an action predefined by the manufacturer, such as entering a program belonging to the second group of the first table 200, or ask the user which program he/she wishes to store into the position that has remained empty.

The association between the i-th position of the third table 400 and the program may occur in any manner, e.g. through a pointer to the i-th position of the first table 200 or of the second table 300, or by associating with the i-th program position of the receiver 1 all the information required by the reception unit 10 and by the processing means 30 in order to select the program to be played when the user presses the i-th key of the user selection unit 90 or anyway the key used for zapping through the programs, i.e. incrementing or decrementing the program number to be played by the receiver.

In the embodiment of the invention that uses pointers for each radio-television program, the first table 200 and the second table 300 may contain or be associated with information required by the reception unit 10 and by the processing means 30, respectively, in order to display the images associated therewith on the visualisation device 50 and to reproduce the associated audio signal. When the user makes a selection by means of the unit 90, the control unit 70 will be able to obtain from the contents of the third table 400, of the first table 200 and of the second table 300 all the information necessary for playing the program selected by the user.

Typically such information includes, for analog radio-television programs, tuning information such as the frequencies of the video and/or audio carriers of the signal, and, for digital radio-television programs, the frequency of the transmission channel of the transport stream as well as the identifier necessary for extracting the program from the transport stream received.

Alternatively, in another embodiment of the invention the third table 400 may contain all the information required by the receiver control unit 70 to be able to reproduce the radio-television program selected by the user by operating the selection unit 90. In this case, the first table 200 and the second table 300 can be ignored or deleted from the memory once the third table 400 has been properly generated and the user has confirmed to the receiver 1 the activation of the third table 400 for his/her next selections.

The method according to the present invention continues with step 116, where the counter i is incremented by one unit.

In step 118 it is verified if the counter i has exceeded a value N representative of the last position of the sorted list 95. If it has not, the procedure is resumed from step 108; if it has, the procedure continues with step 120, where it is verified if there is a radio-television program stored in the i-th position of the second table 300.

If there is, in step 122 the program corresponding to the digital radio-television signal is stored in the i-th position of the third table 400; otherwise, the procedure goes on to step 124, where the counter i is incremented by one unit.

In step 126, it is verified if the counter i is greater than a value D representative of the position of the last digital program of the second table 300.

If it is not, the procedure is resumed from step 120; otherwise, in step 128 the programs belonging to the second group 220 and to the third group 230 of the first table 200, preferably excepting any programs of the second group 220 already entered into any empty positions found in step 115, are queued in the third table 400 after the last digital program stored. As an alternative, the programs belonging to the second group 220 and to the third group 230 may be used for filling any empty positions of the third table 400, such empty positions being derived from empty positions of the second table 300.

When step 128 is executed, it can be established that any programs already entered into the third table 400 must not be entered again. This measure may be subordinated to a user's request about the removal of any duplicates from the third table 400.

The procedure ends in step 130.

From the above description it is clear that the execution of the method according to the invention requires that the first table 200, the second table 300 and the third table 400 contain one piece of information relating to the priority or sorting criterion of the radio-television programs, as well as one piece of information which identifies the program itself. This means that these tables must contain operating parameters which allow the control unit 70, whether directly or indirectly, to properly control the reception unit 10 and the processing means 30 in order to reproduce the radio-television program (video image, audio, teletext, and so on) selected by the user. This information may comprise, for example, the type of tuner 11,15 to be activated, the video carrier frequency, the central frequency of the digital multiplex that carries the program, the identifier of the digital service associated with the radio-television program, the LCN code thereof, and the like.

Note that in some cases and for some programs this second piece of information may be inherent to or implicitly contained in the very sorting criterion, e.g. according to agreements made by the associations of broadcasters. For example, in Italy the radio-television program with LCN equal to 1 (sorting criterion) normally is the program named RAIUNO (identification information), since the associations of Italian broadcasters have decided to reserve that value for program RAIUNO. This information is known to the receiver, which can then use it to minimise memory occupation for the first table 200, the second table 300 and the third table 400, as well as to verify the correspondence between the sorting criteria contained in the first table 200 and second table 300.

It is advantageously conceivable that when the receiver 1 is first switched on the user is offered the possibility to execute the method according to the invention, whether before any other procedural steps or, optionally, after generating the first table 200 and the second table 300.

The third table 400 may advantageously be presented to the user on the visualisation device in any graphic form, e.g. as a sorted list, in order to allow him/her to appreciate the result of the method according to the present invention.

It is also conceivable that the user, during this presentation or even following a recall made upon his/her request, is allowed to make adjustments or changes to the third table 400; in particular, the user may, for example, re-determine the storing order or the labels with which the programs in the list are marked when the receiver 1 is in operation, e.g. modify the label with which the programs are identified on the screen after having been selected through the selection unit (e.g. in order to replace "RAIUNO" with "RAI 1").

The third table 400 may be stored into a non-volatile memory area, so that it is preserved in the event of a power failure and the user must not repeat the execution of the method. At any rate, it is advantageous that the user is allowed to execute the whole method for generating the table 400 again any time he/she thinks it useful or necessary.

It should be noted that the whole method can be carried out, for example, in a fully automatic manner, i.e. without the user's intervention. It is for example conceivable that at first power-on the receiver 1 starts executing the method described herein without any specific request by the user, who may be given the option of setting or changing the country or geographical area he/she belongs to. All or most procedural steps can be carried out according to default modes, i.e. as set at the factory by the manufacturer.

It is also conceivable that the receiver executes the process for generating the third table 400 at regular intervals, e.g. when the receiver is inactive or in stand-by, typically at night, so that said table can be updated following any addition or shift of radio-television programs in the reception area. In such a case, the receiver 1 may store the settings selected by the user during the last recall of the method according to the invention and execute it in the same way without having to interrogate the user.

Alternatively the user may be asked, during the various stages of execution of the method or in a semiautomatic manner, to specify how certain procedural steps must be carried out. When these requests are made, the user may also have the option of specifying that his/her answers become the default settings, i.e. that from then onwards the method will be carried out in accordance with the answer just given, and the receiver 1 will no longer ask for directions in this regard when the method is executed again. Different approaches may therefore be taken.

The method according to the invention may be advantageously implemented in a receiver 1 by providing it in the form of a microprogram or firmware stored in a non-volatile manner and executable by a microprocessor.

Since the criteria for sorting the radio-television programs may change over time in any region, it is advantageous that those stored in the receiver 1 can be updated remotely by means of radio-television signals receivable by the receiver through any one of its own tuners.

The first table 200 and the second table 300 are generated as intermediate steps in order to create the third table 400; they can therefore be stored into a volatile or non-volatile memory area.

The user may advantageously be given the possibility of choosing whether to keep in memory the first table 200 and the second table 300 and, more in general, of deciding on which program table the actions taken by the control unit 70 as a result of the commands issued by the user through the selection unit 90 will depend.

It may be provided that, for example, during the presentation of the third table 400 on the visualisation device 50, built in or associated with the receiver 1, the user is asked if the third table 400 on display must be activated, so that the next selections of radio-television programs made by means of the selection unit 90 will take place in accordance with the third table 400.

The selection step may be carried out, for example, either by the so-called zapping method, i.e. by incrementing or decrementing by one the program number to be tuned to and displayed by using specific keys for incrementing or decrementing the number of the active program, or by directly recalling the desired program number by pressing the corresponding numerical key, which may consist of one or more digits.

Following this selection, the control unit 70 will verify the selected program number and will look up the radio-television program to be reproduced in the third table 400, retrieving, for example, the information required by the reception unit 10 and by the processing means 30 in order to select the program and reproduce it properly as video images through the visualisation device 50, as audio sound through the audio playback unit (not shown in FIG. 1a), and so on.

With reference to the table 400 of FIG. 7, let us assume, for example, that the user has selected the program number 4 by pressing the zapping key for incrementing the program number while the receiver was tuned to and playing the radio-television program RAITRE. In this case, the control unit 70 will see in the third table 400 that the radio-television program associated with position 4 is the digital program RETE 4. At this point, it can obtain the data necessary for reproducing the program desired by the user from the third table 400, whether directly or indirectly, depending on the specific implementation of the method. A first possibility is that the third table 400 contains pointers to the data of the first table 200 and of the second table 300, which were not deleted because they actually contain the information required by the receiver 1 to play the program just selected by the user. In a second embodiment of the invention, such information was transferred to and stored in the third table 400, which contains it integrally. This information includes the data necessary for establishing which tuner 11,15 must be activated, as well as operating parameters of said tuner 11,15 and of the downstream functional units, which include the processing means 30, necessary for selecting, extracting and reproducing the selected program by means of the visualisation device 50, audio playback means, and the like.

In a further embodiment of the present invention, the radio-television signals received by the radio-television signal receiver are both digital, but in two different signal formats. By way of example, the following will describe a method for automatically programming a receiver 1' adapted to receive digital terrestrial and satellite radio-television signals.

Figure 1B:
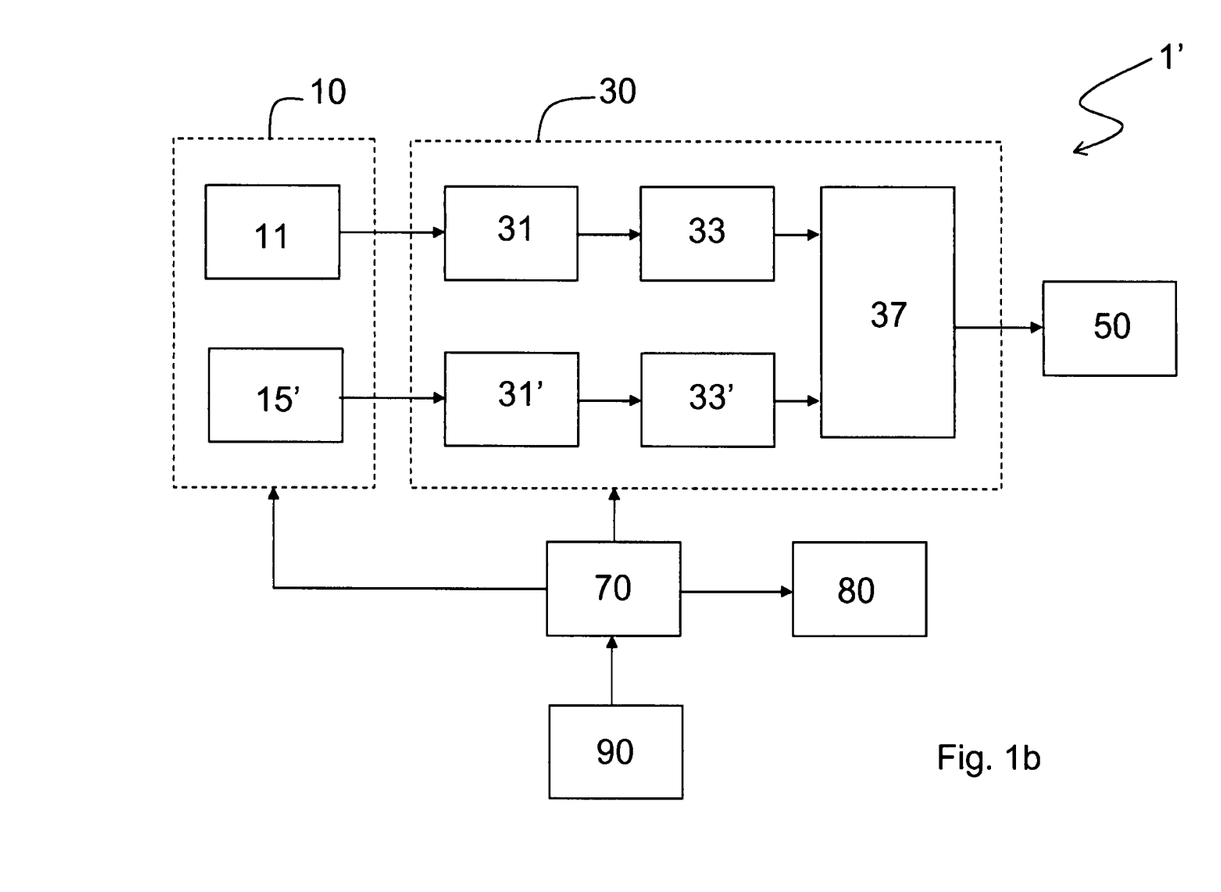

Compared to the receiver 1 of the first embodiment, the receiver 1' shown in FIG. 1b has a reception chain for a digital satellite signal which comprises a digital tuner 15', a demultiplexer 31' and a decoder 33', replacing the analog tuner 15 and the conversion unit 35 of the receiver 1. All other blocks are the same as those already described with reference to the receiver 1.

For simplicity, the case described below will refer to a receiver equipped with two distinct reception chains, each including its own tuner; the method of the present invention can nevertheless be implemented also when the receiver is fitted with a single hybrid tuner, i.e. capable of receiving and tuning to radio-television signals in at least two different formats.

Referring back to FIG. 4, the method starts in step 100.

In step 102, the receiver 1' performs a first scan of the frequency spectrum assigned to the digital terrestrial format, e.g. according to frequency bands and channels selected as a function of the chosen installation area, and stores the list of the identified programs into a first table 200.

In step 104, the receiver 1' performs a scan of the frequency spectrum assigned to the digital satellite format, according to frequency bands and channels identified, for example, on the basis of the installation area setting, of the type and characteristics of the broadcasting satellite, and so on.

The results of the scan are stored into a second table 300.

At this point, a unified list of programs, or third table 400, is generated according to the invention.

The method is similar to the one described above with regard to the first embodiment of the invention, the only difference being that the information used for determining the sorting criteria of the received programs is different. For example, if the radio-television programs received by the tuners 11,15' contain equal LCN codes for the same programs, the receiver 1' can use such LCN codes in order to generate the third table 400 by starting from the first table 200 and second table 300.

It must be pointed out that this second embodiment is particularly advantageous when the satellite bouquet is a replica, even only partial, of the signals available on the digital terrestrial network (for example, when satellite broadcasting is also used for integrating the coverage available through the terrestrial network): in such a case, the LCN codes identifying one specific program will be identical on both platforms.

Note also that the same considerations will apply when the received radio-television signal is transported on cable or IP network, or whenever the receiver is equipped with at least two tuners (for instance, television receivers are already available on the market which integrate the analog receiver with the three DVB-T, DVB-C and DVB-S digital receivers).

Radio-television signal receivers capable of receiving and tuning to radio-television signals complying with transmission standards of different generations on the same transmission medium (e.g. DVB-T and DVB-T2, DVB-S and DVB-S2, DVB-C and DVB-C2) are provided with specific reception and tuning means for each generation of radio-television signals.

The invention has been described herein with reference to a receiver equipped with two radio-television reception chains. It is nonetheless also applicable without any difficulty, i.e. by only requiring adaptations known and obvious to those skilled in the art, to receivers having more than two radio-television reception chains.

The invention is also applicable to the case wherein at least one of the tuners and/or processing means and/or functional blocks thereof is not built in the receiver, but is added or coupled to, and more or less easily removable from, the receiver after the latter has come out of the factory or has been sold by the retailer. For example, a single-tuner radio-television program receiver can be transformed into a hybrid receiver or hybrid or multiple tuning receiver by plugging modular electronic cards into the receiver case. Alternatively, one can purchase external reception devices containing a tuner and possibly also a demodulator and a decoder, which can be easily coupled to a single-tuner receiver through standardised external interface ports, such as a SCART port or a USB port, in order to transform the receiver into a unit capable of receiving additional radio-television programs, e.g. digital terrestrial or satellite ones.

In this case, the control unit may be able to detect the presence of an additional reception chain and to enable the method according to the invention, thus generating, e.g. if the native configuration only included one tuner, not only the first table 200, but also the second table 300 and the third table 400.

The invention is also applicable to the case wherein some functional blocks of the reception unit and of the processing means are common to one or more reception chains of the receiver. For example, the invention may be applied to a DVB-T2 receiver equipped with a decoder also capable of decoding DVB-T signals.

The method for automatically programming a receiver able to receive radio-television signals in at least two different formats and the related receiver described herein by way of example may be subject to many possible variations without departing from the novelty spirit of the inventive idea; it is also clear that in the practical implementation of the invention the illustrated details may have different shapes or be replaced with other technically equivalent elements.

For example, in a variant of the first embodiment a column may be added to the sorted list 95 with a second piece of information useful for determining the sorting criteria of the digital programs, such as, for example, the service name or the network identifier. In this case it will be no longer necessary to verify the correspondence between the position of the program associated with the LCN code in the sorted list 95 and the LCN code.

For example, in a variant of the second embodiment the LCN codes for the same program may differ depending on how the radio-television signal is transported or on the program distributor, e.g. because a satellite radio-television operator re-defines the assignment of the LCN codes to the re-distributed programs.

In this case, the sorted list 95 will contain an identifier, different from the LCN code but included in the radio-television signal of the receivable programs. Said identifier may, for example, be represented by the field "service name" or by the field "network identifier".

In this case, once the first table 200 and the second table 300 have been populated with the scan results, the third table 400 will be generated by verifying the correspondence between the identifier of the program carried by the radio-television signal and the identifier stored in the sorted list 95.

This implies that other data identifying the digital radio-television program and received by the two tuners, such as the service name and the network identifier, must be additionally stored in the first table 200 and in the second table 300.

If the identifier is the content of the "service name" field, the search for matches between the program names of the first table 200 and of the second table 300 can be done by using intelligent algorithms already known and widely used in other applications, which allow partially different representations of one program to be associated together, e.g. "Rai Due", "Rai 2", RAIDUE e "RAI due".

It can therefore be easily understood that the present invention is not limited to the above-described method for automatically programming a receiver able to receive radio-television signals in at least two different formats and the related receiver, but may be subject to many modifications, improvements or replacements of equivalent parts and elements without departing from the inventive idea, as clearly specified in the following claims.

The invention claimed is:

1. A method for automatically programming a receiver adapted to receive radio-television signals belonging to a plurality of radio-television networks in at least two different formats,
said method comprising steps of:
scanning a first frequency spectrum of first radio-television signals broadcast in a first format with a receiver to identify the first radio-television signals receivable by the receiver;
scanning a second frequency spectrum of second radio-television signals in a second signal format with the receiver to identify the second radio-television signals receivable by the receiver, wherein each of the first radio-television signals and each of the second radio-television signals is associated with a certain transmission frequency and corresponds to a channel;
storing into a first table the channels of said first radio-television signals receivable by said receiver and associable with a first sorting criterion;
storing into a second table the channels of said second radio-television signals receivable by said receiver and associable with a second sorting criterion; and
storing into a third table channels stored in said first and second tables based on existing matches between said first sorting criterion and said second sorting criterion, wherein entries in the third table relate a channel identifier with each of the channels.

2. A method according to claim 1, wherein at least one of said first sorting criterion and said second sorting criterion is stored in a memory area of said receiver as an association between a priority and the channel identifier.

3. A method according to claim 1, wherein at least one of said first criterion and said second sorting criterion is an identifier which can be obtained from data contained in the radio-television signals associated with the radio-television networks.

4. A method according to claim 3, wherein said identifier is a number pre-assigned to a certain radio-television signal receivable in a certain geographical or catchment area.

5. A method according to claim 3, wherein said identifier contains data associated with the radio-television signal and pre-assigned by a consortium of radio-television broadcasters, wherein the data includes a service name and/or the network identifier.

6. A method according to claim 2, wherein said priority or said pre-assigned number are established for a subset of the radio-television signals receivable in a certain geographical or catchment area.

7. A method according to claim 1, comprising the step of extracting a radio-television signal which can be reproduced by suitable reproduction means, wherein at least said third table comprises information required by control means to select, through a reception unit, and process, through processing means, a radio-television signal, so as to reproduce it when selected by the user through a selection unit.

8. A method according to claim 7, wherein said method is implemented through a non-transitory micro program executable by said control means.

9. A method according to claim 1, comprising the step of displaying at least said third table on a visualisation device associated with or built in said receiver.

10. A method according to claim 9, comprising a step wherein the user re-determines the sorting order of the channels contained in at least said third table.

11. A method according to claim 1, wherein the selection of a radio-television signal is made through a selection unit based on the contents of said third table.

12. A receiver adapted to receive radio-television signals belonging to a plurality of radio-television networks in at least two different formats, said receiver comprising:
a receiver configured to:
scan a first frequency spectrum of first radio-television signals broadcast in a first format to identify the first radio-television signals receivable by the receiver; and
scan a second frequency spectrum of second radio-television signals in a second signal format to identify the second radio-television signals receivable by the receiver, wherein each of the first radio-television signals and each of the second radio-television signals is associated with a certain transmission frequency and corresponds to a channel;
means for storing into a first table the channels of the first radio-television signals of said plurality of radio-television networks receivable by said receiver and associable with a first sorting criterion;
means for storing into a second table the channels of said second radio-television signals receivable by said receiver and associable with a second sorting criterion; and
means for storing into a third table channels stored in said first and second tables based on existing matches between said first sorting criterion and said second sorting criterion, wherein entries in the third table relate a channel identifier with each of the channels.

13. A receiver according to claim 12, wherein at least one of said first sorting criterion and said second sorting criterion is stored in a memory area of said receiver as an association between a priority and the channel identifier.

14. A receiver according to claim 12, wherein at least one of said first sorting criterion and said second sorting criterion is an identifier which can be obtained from data contained in the radio-television signals associated with the radio-television networks.

15. A receiver according to claim 14, wherein said identifier is a number pre-assigned to a certain radio-television signal receivable in a certain geographical or catchment area.

16. A receiver according to claim 14, wherein said identifier contains data associated with the radio-television signal and pre-assigned by a consortium of radio-television broadcasters, wherein the data includes a service name and/or the network identifier.

17. A receiver according to claim 13, wherein said priority or said pre-assigned number are established for a subset of the radio-television signals receivable in a certain geographical or catchment area.

18. A receiver according to claim 12, comprising means for extracting a radio-television signal which can be reproduced by suitable reproduction means, wherein at least said third table comprises information required by control means to select, through a reception unit, and process, through processing means, a radio-television signal, so as to reproduce it when selected by the user through a selection unit.

19. A receiver according to claim 13, comprising means for generating a video signal comprising information for displaying at least said third table on a visualisation device associated with or built in said receiver.

20. A receiver according to claim 19, comprising means which allow the user to re-determine the sorting order of the channels contained in at least said third table.

21. A receiver according to claim 13, wherein the selection of a radio-television signal is made through said user selection unit based on the contents of said third table.

22. A receiver according to claim 13, wherein at least one of a tuner, a demodulator and/or a decoder, of a reception chain can be coupled to a signal processing unit through a standard external interface port.

* * * * *